(12) United States Patent
Wang (10) Patent No.: US 11,741,587 B2
(45) Date of Patent: Aug. 29, 2023

(54) MURA DETECTING METHOD, DEVICE AND READABLE STORAGE MEDIUM

(71) Applicant: HUIZHOU CHINA STAR OPTOELECTRONICS TECHNOLOGY CO., LTD., Guangdong (CN)

(72) Inventor: Yanxue Wang, Guangdong (CN)

(73) Assignee: HUIZHOU CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 565 days.

(21) Appl. No.: 16/962,426

(22) PCT Filed: Jul. 1, 2020

(86) PCT No.: PCT/CN2020/099631
§ 371 (c)(1),
(2) Date: Jul. 15, 2020

(87) PCT Pub. No.: WO2021/237872
PCT Pub. Date: Dec. 2, 2021

(65) Prior Publication Data
US 2023/0091782 A1    Mar. 23, 2023

(30) Foreign Application Priority Data
May 29, 2020 (CN) .................. 202010475158.X (51) Int. Cl.
*G06T 7/00* (2017.01)
*G06V 10/25* (2022.01)
(Continued)

(52) U.S. Cl.
CPC ............ *G06T 7/0002* (2013.01); *G06V 10/25* (2022.01); *G06V 10/56* (2022.01); *G06V 10/60* (2022.01);
(Continued)

(58) Field of Classification Search
CPC ........ G06T 7/0002; G06T 2207/10024; G06V 10/25; G06V 10/56; G06V 10/60; G06V 2201/07
(Continued)

(56) References Cited

U.S. PATENT DOCUMENTS

| 5,917,935 A | 6/1999 | Hawthorne et al. |
| 2009/0096729 A1* | 4/2009 | Ozawa ................ G09G 3/3648 345/87 |

(Continued)

FOREIGN PATENT DOCUMENTS

| CN | 103869511 A | 6/2014 |
| CN | 104137171 A | 11/2014 |

(Continued)

*Primary Examiner* — Ali Bayat
(74) *Attorney, Agent, or Firm* — Soroker Agmon Nordman Riba (57) ABSTRACT

The present application discloses a mura detecting method, device and readable storage medium. The method includes obtaining an area of a target test image obtained from an original image signal where mura exists to serve as a target test area; processing the target test area to obtain a grayscale distribution; obtaining a brightness gradient distribution based on the grayscale distribution; calculating a SEMU value based on the brightness gradient distribution; and obtaining a location corresponding to the mura area based on the SEMU value. It realizes objective measurement and evaluation of halo phenomenon.

17 Claims, 5 Drawing Sheets

(51) Int. Cl.
*G06V 10/56* (2022.01)
*G06V 10/60* (2022.01)

(52) U.S. Cl.
CPC ............... *G06T 2207/10024* (2013.01); *G06V 2201/07* (2022.01)

(58) Field of Classification Search
USPC .......................................................... 382/275
See application file for complete search history.

(56) References Cited

U.S. PATENT DOCUMENTS

| | | | |
|---|---|---|---|
| 2009/0175530 A1* | 7/2009 | Sjostrom | G06T 7/0004 382/152 |
| 2010/0013751 A1* | 1/2010 | Kerofsky | G09G 3/3611 345/89 |
| 2012/0026315 A1 | 2/2012 | Lee et al. | |
| 2013/0201660 A1* | 8/2013 | Barbier | G02B 1/118 428/141 |
| 2018/0047368 A1* | 2/2018 | Luo | G09G 3/20 |
| 2019/0191150 A1* | 6/2019 | Zhang | G06T 7/0004 |

FOREIGN PATENT DOCUMENTS

| | | |
|---|---|---|
| CN | 104160439 A | 11/2014 |
| CN | 109285143 A | 1/2019 |

\* cited by examiner

MURA DETECTING METHOD, DEVICE AND READABLE STORAGE MEDIUM

FIELD OF THE DISCLOSURE

The present application relates to a field of grayscale brightness adjustment, and more particularly to a mura detecting method, device and readable storage medium.

DESCRIPTION OF RELATED ARTS

Local diming refers to dividing the backlight of a liquid crystal display (LCD) into N small areas (Blocks). In operation, backlight brightness is adjusted based on grayscale of the content displayed by the LCD in a corresponding small area of so as to achieve energy saving and image quality enhancement.

TECHNICAL PROBLEMS

With developing of the technology, local dimming is easy to introduce a halo phenomenon, which is a type of mura. That is, limited by contrast properties originally resided in a partitioned backlight panel, the halo phenomenon exists at black pixels next to the pixels with high brightness. This affects the display effect of images with high contrast. The areas with this phenomenon are small and thus cannot be measured using an optical measuring instrument. In existing skills, it cannot be measured objectively since human eyes perform a subjective evaluation generally.

TECHNICAL SOLUTIONS

To solve above technical problems, a technical solution utilized in the present application is to provide a mura detecting method, the method including: obtaining an original image signal; obtaining a target test image from the original image signal; obtaining an area of the target test image where mura exists to serve as a target test area; processing the target test area to obtain a grayscale distribution of the target test area; obtaining a brightness gradient distribution of the target test area based on the grayscale distribution; calculating a SEMU value based on the brightness gradient distribution of the target test area; and obtaining a location corresponding to the mura area based on the SEMU value.

To solve above technical problems, another technical solution utilized in the present application is to provide a mura detecting device, the device including: a first obtaining module, configured to obtain an original image signal; a second obtaining module, configured to obtaining a target test image from the original image signal; a third obtaining module, configured to obtain an area of the target test image where mura exists to serve as a target test area; a processing module, configured to process the target test area to obtain a grayscale distribution of the target test area; a brightness gradient obtaining module, configured to obtain a brightness gradient distribution of the target test area based on the grayscale distribution; a calculating module, configured to calculate a SEMU value based on the brightness gradient distribution of the target test area; and a location obtaining module, configured to obtain a location corresponding to the mura area based on the SEMU value.

To solve above technical problems, another technical solution utilized in the present application is to provide a computer readable storage medium, the storage medium storing a plurality of instructions applicable to be loaded by a processor to execute the following steps: obtaining an original image signal; obtaining a target test image from the original image signal; obtaining an area of the target test image where mura exists to serve as a target test area; processing the target test area to obtain a grayscale distribution of the target test area; obtaining a brightness gradient distribution of the target test area based on the grayscale distribution; calculating a SEMU value based on the brightness gradient distribution of the target test area; and obtaining a location corresponding to the mura area based on the SEMU value.

BENEFICIAL EFFECTS

The beneficial effects of the present application are described below. Distinguishable from the existing skills, the present application provides a mura detecting method, device and readable storage medium, in which a brightness gradient curve of the target test area is obtained by processing the obtained original image information, a location relationship curve between SEMU and the image is obtained by SEMU calculations, and a location corresponding to the mura area is obtained based on the location relationship curve. In such a way, it realizes objective measurement and evaluation of the halo phenomenon.

DESCRIPTION OF DRAWINGS

For explaining the technical solutions used in the embodiments of the present application more clearly, the appending figures to be used in describing the embodiments will be briefly introduced in the following. Obviously, the appending figures described below are only some of the embodiments of the present application, and those of ordinary skill in the art can further obtain other figures according to these figures without making any inventive effort, in which.

DESCRIPTION OF EMBODIMENTS OF THE DISCLOSURE

The technical solutions in the embodiments of the present application are clearly and completely described below with reference to appending drawings of the embodiments of the present application. Obviously, the described embodiments are merely a part of embodiments of the present application and are not all of the embodiments. Based on the embodiments of the present application, all the other embodiments obtained by those of ordinary skill in the art without making any inventive effort are within the scope sought to be protected in the present application.

In the present application, the terms "first", "second" and "third" are used for descriptive purposes only, and should not be construed to indicate or imply relative importance, or implicitly indicate the indicated number of technical features. Thus, by defining a feature with "first", "second" or "third" may explicitly or implicitly include at least the feature. In the description of the present application, "a plurality" means at least two (for example, two or three) unless explicitly defined otherwise. In the embodiments of the present application, all the directional indication (e.g., upper, lower, left, right, front, rear and so on) is merely used to interpret relative positional relationship, motion and the like between the elements (shown in the appending figures) at a specific pattern. The directional indication will change as a change of the pattern.

The term "embodiment" or "implementation" referred to herein means that a particular feature, structure or property described in conjunction with the embodiment may be contained in at least one embodiment of the present application. The phrase appearing in various places in the specification does not necessarily refer to the same implementation, nor does it refer to an independent or alternative implementation that is mutually exclusive with other implementations. It is expressly and implicitly understood by those skilled in the art that an implementation described herein may be combined with other implementations.

It can be understood that a mura area can represent an area where a halo phenomenon occurs in the present application, that is, the halo phenomenon is taken as a type of mura in the present application.

Figure 1:
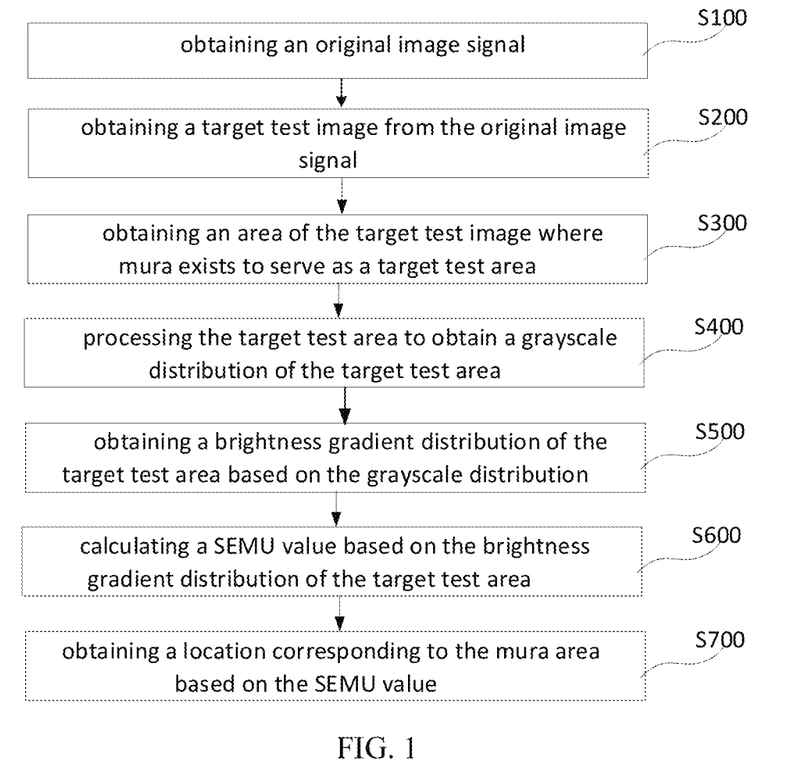
FIG. 1 is a flowchart of a mura detecting method in accordance with an embodiment of the present application.

FIG. 1 is a flowchart of a mura detecting method in accordance with an embodiment of the present application. As shown in FIG. 1, the mura detecting method provided in the present application includes the following steps.

S100—obtaining an original image signal.

Figure 2:
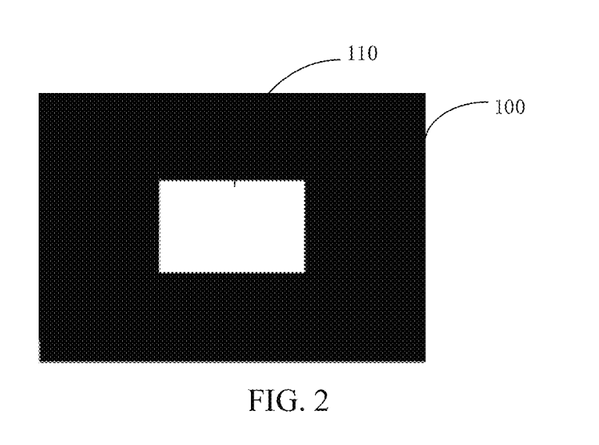
FIG. 2 is a schematic diagram illustrating an original image signal in accordance with the present application.

FIG. 2 is a schematic diagram illustrating obtaining an original image signal in accordance with the present application. A middle area of the original image signal 100 is an area where white pixels 110 are located.

S200—obtaining a target test image from the original image signal.

Figure 3:
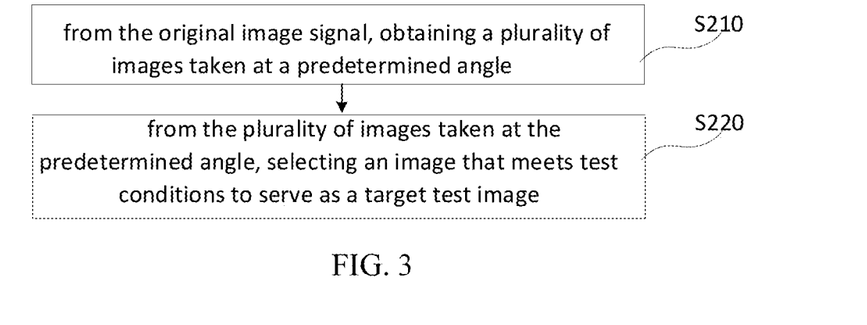
FIG. 3 is a flowchart of Step S200 in accordance with an embodiment of the present application.

FIG. 3 is a flowchart of Step S200 in accordance with an embodiment of the present application. Optionally, referring to FIG. 3, Step S200 further includes the following sub steps.

S210—from the original image signal, obtaining a plurality of images taken at a predetermined angle.

In order to enhance imaging of the halo phenomenon, it needs to obtain a plurality of images taken at predetermined angles, from the original image signal 100. Specifically, the shooting angle is set as 45 degrees and a light-shielding plate is utilized to shield the white pixels 110. Optionally, affected by the number of divided areas, the halo phenomenon may differ when the positions of the white pixels 110 are different. Thus, slightly shifting the positions of the white pixels 110 can obtain a plurality of images taken at 45 degrees. Of course, in the embodiment of the present application, the halo phenomenon is more apparent when the shooting angle is set as 45 degrees. However, in other embodiments, other shooting angles may be adopted to obtain the images, and it is not limited herein.

S220—from the plurality of images taken at the predetermined angle, selecting an image that meets test conditions to serve as a target test image.

Figure 4:
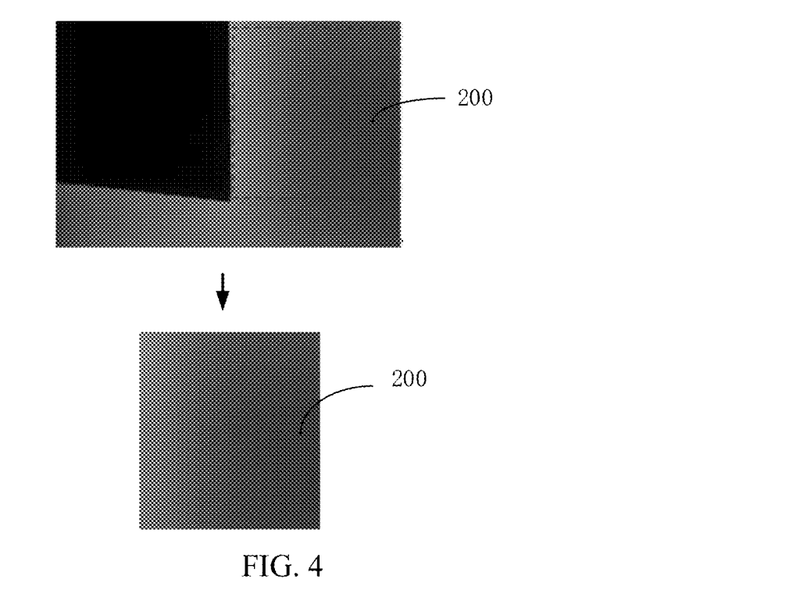
FIG. 4 is a schematic diagram illustrating a target test image in accordance with an embodiment of the present application.

FIG. 4 is a schematic diagram illustrating a target test image in accordance with an embodiment of the present application. In the present application, an image with the most severe halo phenomenon is selected as the target test image, that is, the more the light leakage at black edges in the target test image, the more severe the halo phenomenon.

S300—obtaining an area of the target test image where mura exists to serve as a target test area.

Operations such as rotating and cropping are performed on the target test image to obtain the area where the halo phenomenon exists, that is, a mura area 200 serves as the target test area.

S400—processing the target test area to obtain a grayscale distribution of the target test area.

Figure 5:
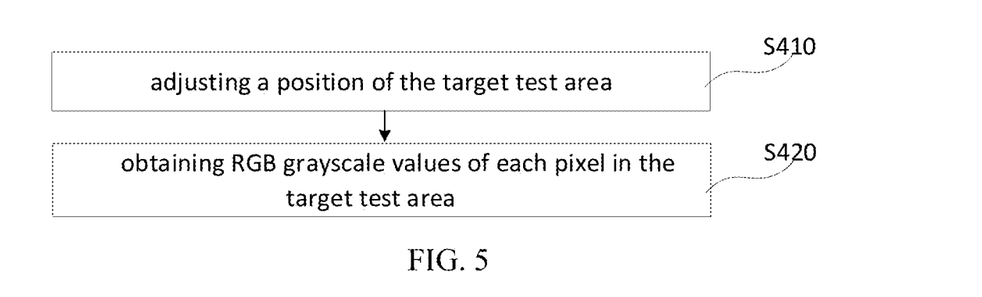
FIG. 5 is a flowchart of Step S400 in accordance with an embodiment of the present application.

FIG. 5 is a flowchart of Step S400 in accordance with an embodiment of the present application. As shown in FIG. 5, Step S400 of the present application further includes the following sub steps.

S410—adjusting a position of the target test area.

In the embodiment of the present application, a program "MATLAB" is utilized to process the image and especially, to slightly adjust the position of the target test area of the image.

S420—obtaining RGB grayscale values of each pixel in the target test area.

Since the obtained image information is directed to RGB signals, MATLAB can directly read RGB grayscale values of each pixel in the target test area, thereby obtaining a grayscale distribution of the target test area.

S500—obtaining a brightness gradient distribution of the target test area based on the grayscale distribution.

Figure 6:
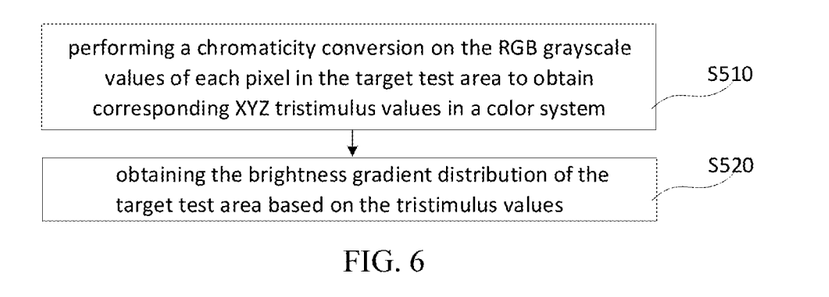
FIG. 6 is a flowchart of Step S500 in accordance with an embodiment of the present application.

FIG. 6 is a flowchart of Step S500 in accordance with an embodiment of the present application. As shown in FIG. 6, Step S500 of the present application further includes the following sub steps.

S510—performing a chromaticity conversion on the RGB grayscale values of each pixel in the target test area to obtain corresponding XYZ tristimulus values in a color system.

Specifically, the tristimulus values are obtained by conversion using a CIE chromaticity system (RGB-XYZ), in which a transformation between an RGB space and a XYZ space is performed based on linear tristimulus data, and adopts a formula below:

$$\begin{bmatrix} X \\ Y \\ Z \end{bmatrix} = A * \begin{bmatrix} R \\ G \\ B \end{bmatrix},$$

where A is a transformation matrix represented by:

$$A = \begin{bmatrix} 0.41425 & 0.35758 & 0.18042 \\ 0.21267 & 0.71516 & 0.07217 \\ 0.01933 & 0.11919 & 0.95023 \end{bmatrix}.$$

S520—obtaining the brightness gradient distribution of the target test area based on the tristimulus values.

The brightness gradient distribution of the target test area is obtained based on the aforesaid tristimulus values and the principle of brightness calibration.

S600—calculating a SEMU value based on the brightness gradient distribution of the target test area.

Optionally, a formula used to calculate the SEMU value is:

$$SEMU = \frac{|C_x|}{C_{jnd}} = \frac{|C_x|}{1.97/S_x^{0.33} + 0.72}; \text{ and}$$

$$|C_x| = |C_1 - C_2|/C_2,$$

where C1 is an average grayscale value of the mura area, C2 is an average grayscale value of an area outside the mura area, Sx is the area of the mura area, and SEMU is a mura level of the mura area. Because of human eyes' response to contrast, the identification of mura by human eyes is related to the size of mura.

S700—obtaining a location corresponding to the mura area based on the SEMU value.

Figure 7:
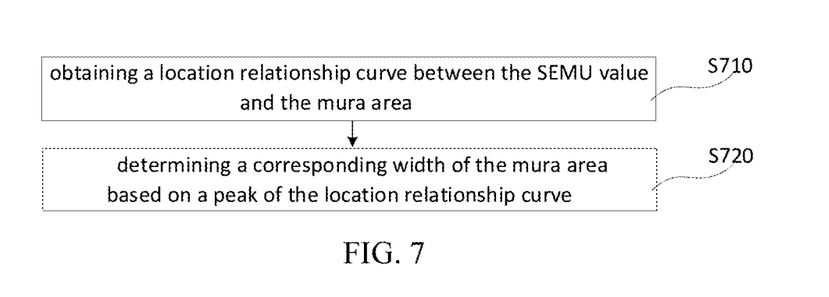
FIG. 7 is a flowchart of Step S700 in accordance with an embodiment of the present application.

FIG. 7 is a flowchart of Step S700 in accordance with an embodiment of the present application. As shown in FIG. 7, Step S700 of the present application further includes the following sub steps.

S710—obtaining a location relationship curve between the SEMU value and the mura area.

S720—determining a corresponding width of the mura area based on a peak of the location relationship curve.

Figure 8:
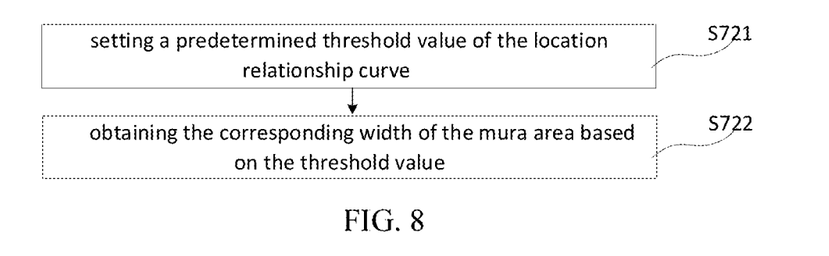
FIG. 8 is a flowchart of Step S720 in accordance with an embodiment of the present application.

Optionally, it can be known how severe the halo phenomenon is based on the location relationship curve between the SEMU value and the mura area. Specifically, it can be referred to FIG. 8, which is a flowchart of Step S720 in accordance with an embodiment of the present application. As shown in FIG. 8, Step S720 of the present application further includes the following sub steps.

S721—setting a predetermined threshold value of the location relationship curve.

Figure 9:
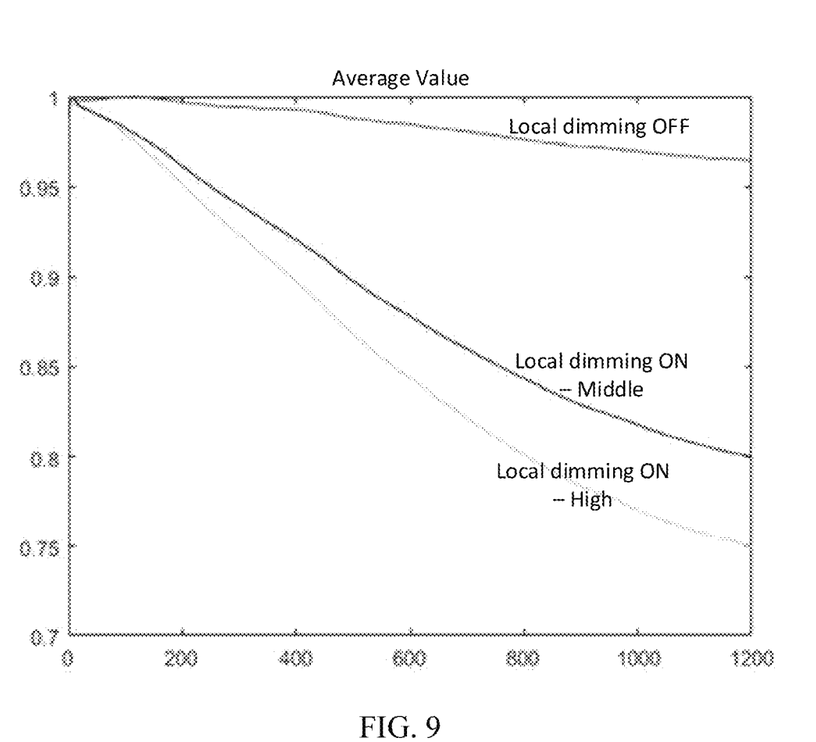
FIG. 9 is a diagram illustrating a normalized gradient intensity distribution in accordance with the present application.
Figure 10:
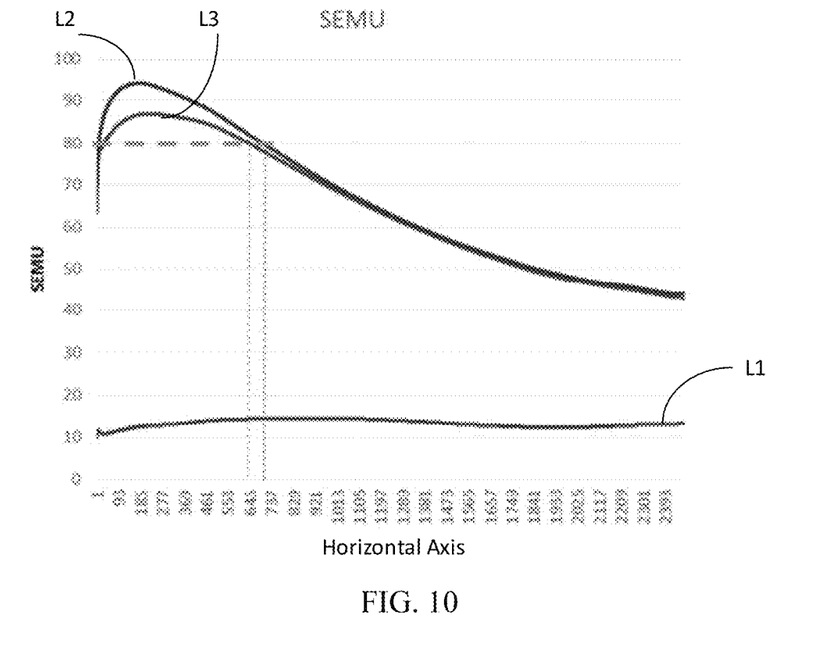
FIG. 10 is a diagram illustrating a location relationship curve between a SEMU value and a mura area in accordance with the present application.

Please refer to FIGS. 9 and 10. FIG. 9 is a diagram illustrating a normalized gradient intensity distribution in accordance with the present application. FIG. 10 is a diagram illustrating a location relationship curve between a SEMU value and a mura area in accordance with the present application. As shown in FIG. 10, the three curves are location relationship curves under three different conditions, respectively. The first curve is Curve L1 obtained when local dimming is off, the second curve is Curve L2 obtained when local dimming is on at "high", and the third curve is Curve L3 obtained when local dimming is on at "middle". The horizontal axis shows location information of the image, the vertical axis shows values of SEMU, and corresponding peaks of the curves indicate the intensity.

In the embodiment of the present application, a threshold value may be set to determine a relative location where the halo phenomenon exists. Specifically, the threshold value can be set as 80 for the SEMU value. However, in other embodiments, the threshold value may also be set as other values, and it is not limited herein.

S722—obtaining a corresponding width of the mura area based on the threshold value.

By referring to FIG. 9, it can be known that the SEMU value is much lower when the local dimming is off and meanwhile, the halo phenomenon does not exist. The halo phenomenon exists when the local dimming is on. The intensity values of Curves L2 and L3 are 94 and 87 at "high" and "middle", respectively. Meanwhile, by considering the panel size, 187 mm and 173 mm can be obtained for the width of the halo for the two curves.

In above embodiments, a brightness gradient curve of the target test area is obtained by processing the obtained original image information, a location relationship curve between SEMU and the image is obtained by SEMU calculations, and a location corresponding to the mura area is obtained based on the location relationship curve. In such a way, it realizes objective measurement and evaluation of the halo phenomenon.

Figure 11:
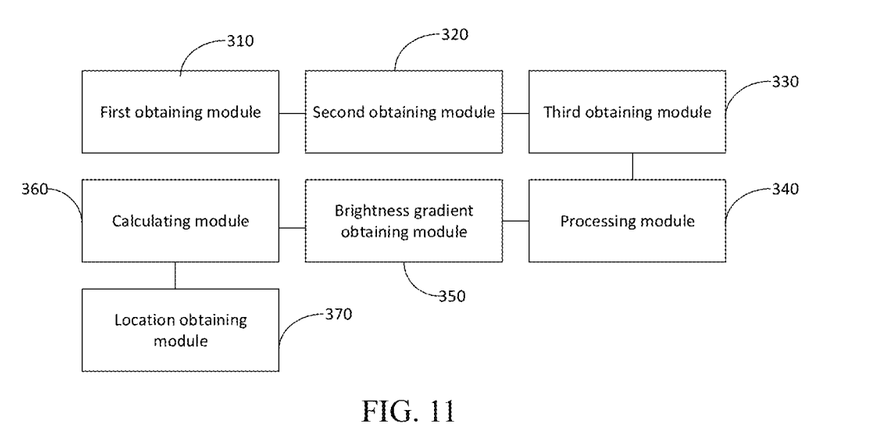
FIG. 11 is a structural schematic diagram illustrating a mura detecting device in accordance with an embodiment of the present application.

FIG. 11 is a structural schematic diagram illustrating a mura detecting device in accordance with an embodiment of the present application. As shown in FIG. 11, the mura detecting device 300 of the present application includes a first obtaining module 310, a second obtaining module 320, a third obtaining module 330, a processing module 340, a brightness gradient obtaining module 350, a calculating module 360 and a location obtaining module 370.

The first obtaining module 310 is configured to obtain an original image signal.

The second obtaining module 320 is configured to obtain a target test image from the original image signal.

The second obtaining module 320 is further configured to obtain, from the original image signal, a plurality of images taken at a predetermined angle; and select, from the plurality of images taken at the predetermined angle, an image that meets test conditions to serve as a target test image.

The third obtaining module 330 is configured to obtain an area of the target test image where mura exists to serve as a target test area.

The processing module 340 is configured to process the target test area to obtain a grayscale distribution of the target test area.

The processing module 340 is further configured to adjust a position of the target test area; and obtain RGB grayscale values of each pixel in the target test area.

The brightness gradient obtaining module 350 is configured to obtain a brightness gradient distribution of the target test area based on the grayscale distribution.

Optionally, the brightness gradient obtaining module 350 is further configured to perform a chromaticity conversion on the RGB grayscale values of each pixel in the target test area to obtain corresponding XYZ tristimulus values in a color system; and obtain the brightness gradient distribution of the target test area based on the tristimulus values.

The calculating module 360 is configured to calculate a SEMU value based on the brightness gradient distribution of the target test area.

The location obtaining module 370 is configured to obtain a location corresponding to the mura area based on the SEMU value.

Optionally, the location obtaining module 370 is further configured to obtain a location relationship curve between the SEMU value and the mura area; and determine a corresponding width of the mura area based on a peak of the location relationship curve. The determine the corresponding width of the mura area based on the peak of the location relationship curve further includes setting a predetermined threshold value of the location relationship curve; and obtaining the corresponding width of the mura area based on the threshold value.

In above embodiments, a brightness gradient curve of the target test area is obtained by processing the obtained original image information, a location relationship curve between SEMU and the image is obtained by SEMU calculations, and a location corresponding to the mura area is obtained based on the location relationship curve. In such a way, it realizes objective measurement and evaluation of the halo phenomenon.

During specific implementation, the foregoing modules and units may be implemented as independent entities, or may be implemented as one or more entities through random combination. For specific implementation of the foregoing modules and units, refer to the above method embodiments, and details are not described herein again.

A person of ordinary skill in the art may understand that all or some of the steps in various methods of the foregoing embodiments may be implemented by program instructions, or may be implemented by a program instructing relevant hardware. The program instructions may be stored in a computer readable storage medium, and be loaded and executed by a processor. For this, an embodiment of the present embodiment provides a storage medium, which stores a plurality of instructions that can be loaded by the processor to execute the steps of any of the mura detecting methods provided in the embodiments of the present application.

The storage medium may include a read only memory (ROM), a random access memory (RAM), a magnetic disk or an optic disc.

Since the instructions stored in the storage medium can execute the steps of any of the mura detecting methods provided in the embodiments of the present application, it can realize the beneficial effects achieved by any of the mura detecting methods provided in the embodiments of the present application, which are referred to above embodiments and are not repeated herein.

Implementation of above operations may refer to above embodiments, and is not repeated herein.

Above all, it is easy to be understood by a person of ordinary skill in the art that the present application provides a mura detecting method, device and readable storage medium, in which a brightness gradient curve of the target test area is obtained by processing the obtained original image information, a location relationship curve between SEMU and the image is obtained by SEMU calculations, and a location corresponding to the mura area is obtained based on the location relationship curve. In such a way, it realizes objective measurement and evaluation of the halo phenomenon.

The above are merely embodiments of the present application and the claims of the present application are not limited thereto accordingly. Any modifications of equivalent structures or equivalent processes, or directly or indirectly used in other related technical fields based on the content of the specification and drawings of the present application are still covered by the claims of the present application.

The invention claimed is:

1. A mura detecting method, comprising:
obtaining an original image signal;
obtaining a target test image from the original image signal;
obtaining an area of the target test image where mura exists to serve as a target test area;
processing the target test area to obtain a grayscale distribution of the target test area;
obtaining a brightness gradient distribution of the target test area based on the grayscale distribution;
calculating a SEMI mura (SEMU, where SEMI stands for Semiconductor Equipment and Materials International) value based on the brightness gradient distribution of the target test area, wherein SEMU is a mura level of a mura area; and
obtaining a location corresponding to the mura area based on the SEMU value.

2. The method according to claim 1, wherein the processing the target test area to obtain the grayscale distribution of the target test area comprises:
adjusting a position of the target test area; and
obtaining RGB grayscale values of each pixel in the target test area.

3. The method according to claim 2, wherein the obtaining the brightness gradient distribution of the target test area based on the grayscale distribution comprises:
performing a chromaticity conversion on the RGB grayscale values of each pixel in the target test area to obtain corresponding XYZ tristimulus values in a color system; and
obtaining the brightness gradient distribution of the target test area based on the tristimulus values.

4. The method according to claim 3, wherein the performing the chromaticity conversion on the RGB grayscale values of each pixel adopts the following formula:

$$\begin{bmatrix} X \\ Y \\ Z \end{bmatrix} = A * \begin{bmatrix} R \\ G \\ B \end{bmatrix},$$

where A is a transformation matrix represented by:

$$A = \begin{bmatrix} 0.41425 & 0.35758 & 0.18042 \\ 0.21267 & 0.71516 & 0.07217 \\ 0.01933 & 0.11919 & 0.95023 \end{bmatrix}.$$

5. The method according to claim 3, wherein the SEMU value is calculated using the following formula:

$$SEMU = \frac{|C_x|}{C_{jnd}} = \frac{|C_x|}{1.97/S_x^{0.33} + 0.72}; \text{ and}$$

$$|C_x| = |C_1 - C_2|/C_2,$$

where C1 is an average grayscale value of the mura area, C2 is an average grayscale value of an area outside the mura area, Sx is the area of the mura area.

6. The method according to claim 3, wherein the obtaining the location corresponding to the mura area based on the SEMU value comprises:
obtaining a location relationship curve between the SEMU value and the mura area; and
determining a corresponding width of the mura area based on a peak of the location relationship curve.

7. The method according to claim 6, wherein the determining the corresponding width of the mura area based on the peak of the location relationship curve comprises:
setting a predetermined threshold value of the location relationship curve; and
obtaining the corresponding width of the mura area based on the threshold value.

8. The method according to claim 1, wherein the obtaining the target test image from the original image signal comprises:
from the original image signal, obtaining a plurality of images taken at a predetermined angle; and
from the plurality of images taken at the predetermined angle, selecting an image that meets test conditions to serve as a target test image.

9. A mura detecting device, comprising:
a processor; and
a memory connected with the processor, the memory comprising a plurality of program instructions executed by the processor to perform the steps of:
obtaining an original image signal;
obtaining a target test image from the original image signal;
obtaining an area of the target test image where mura exists to serve as a target test area;
processing the target test area to obtain a grayscale distribution of the target test area;
obtaining a brightness gradient distribution of the target test area based on the grayscale distribution;
calculating a SEMI mura (SEMU, where SEMI stands for Semiconductor Equipment and Materials International) value based on the brightness gradient distribution of the target test area, wherein SEMU is a mura level of a mura area; and
obtaining a location corresponding to the mura area based on the SEMU value.

10. A non-transitory computer readable storage medium, which stores a plurality of instructions applicable to be loaded by a processor to execute the following steps:
obtaining an original image signal;
obtaining a target test image from the original image signal;
obtaining an area of the target test image where mura exists to serve as a target test area;
processing the target test area to obtain a grayscale distribution of the target test area;
obtaining a brightness gradient distribution of the target test area based on the grayscale distribution;
calculating a SEMI mura (SEMU, where SEMI stands for Semiconductor Equipment and Materials International) value based on the brightness gradient distribution of the target test area, wherein SEMU is a mura level of a mura area; and
obtaining a location corresponding to the mura area based on the SEMU value.

11. The non-transitory computer readable storage medium according to claim 10, wherein the processing the target test area to obtain the grayscale distribution of the target test area comprises:
adjusting a position of the target test area; and
obtaining RGB grayscale values of each pixel in the target test area.

12. The non-transitory computer readable storage medium according to claim 11, wherein the obtaining the brightness gradient distribution of the target test area based on the grayscale distribution comprises:
performing a chromaticity conversion on the RGB grayscale values of each pixel in the target test area to obtain corresponding XYZ tristimulus values in a color system; and
obtaining the brightness gradient distribution of the target test area based on the tristimulus values.

13. The non-transitory computer readable storage medium according to claim 12, wherein the performing the chromaticity conversion on the RGB grayscale values of each pixel adopts the following formula:

$$\begin{bmatrix} X \\ Y \\ Z \end{bmatrix} = A * \begin{bmatrix} R \\ G \\ B \end{bmatrix},$$

where A is a transformation matrix represented by:

$$A = \begin{bmatrix} 0.41425 & 0.35758 & 0.18042 \\ 0.21267 & 0.71516 & 0.07217 \\ 0.01933 & 0.11919 & 0.95023 \end{bmatrix}.$$

14. The non-transitory computer readable storage medium according to claim 12, wherein the SEMU value is calculated using the following formula:

$$SEMU = \frac{|C_x|}{C_{jnd}} = \frac{|C_x|}{1.97/S_x^{0.33} + 0.72}; \text{ and}$$

$$|C_x| = |C_1 - C_2|/C_2,$$

where C1 is an average grayscale value of the mura area, C2 is an average grayscale value of an area outside the mura area, Sx is the area of the mura area.

15. The non-transitory computer readable storage medium according to claim 12, wherein the obtaining the location corresponding to the mura area based on the SEMU value comprises:
obtaining a location relationship curve between the SEMU value and the mura area; and
determining a corresponding width of the mura area based on a peak of the location relationship curve.

16. The non-transitory computer readable storage medium according to claim 15, wherein the determining the corresponding width of the mura area based on the peak of the location relationship curve comprises:
setting a predetermined threshold value of the location relationship curve; and
obtaining the corresponding width of the mura area based on the threshold value.

17. The non-transitory computer readable storage medium according to claim 10, wherein the obtaining the target test image from the original image signal comprises:
from the original image signal, obtaining a plurality of images taken at a predetermined angle; and
from the plurality of images taken at the predetermined angle, selecting an image that meets test conditions to serve as a target test image.

* * * * *